United States Patent [19]

Pike et al.

[11] 4,156,144

[45] May 22, 1979

[54] ADIABATIC INVERSION FOR SELECTIVE EXCITATION

[75] Inventors: Charles T. Pike, Lexington; Horace W. Furumoto, Wellesley, both of Mass.; Lawrence A. Levin, Beer Sheva, Israel

[73] Assignee: Jersey Nuclear-Avco Isotopes, Inc., Bellevue, Wash.

[21] Appl. No.: 483,077

[22] Filed: Jun. 25, 1974

Related U.S. Application Data

[63] Continuation of Ser. No. 465,264, Apr. 29, 1974, abandoned.

[51] Int. Cl.² ............................................. H01J 37/08
[52] U.S. Cl. .................................. 250/423 P; 250/284
[58] Field of Search ................... 250/423, 423 P, 424, 250/281, 282, 283, 284; 204/157.1 H

[56] References Cited

U.S. PATENT DOCUMENTS

| | | | |
|---|---|---|---|
| 4,023,038 | 5/1977 | Janes | 250/423 P |
| 4,038,549 | 7/1977 | Janes | 250/423 P |

*Primary Examiner*—Craig E. Church
*Attorney, Agent, or Firm*—Weingarten, Maxham & Schurgin

[57] ABSTRACT

Method and apparatus for achieving isotopically selective adiabatic inversion, particularly for improved isotope separation efficiency. In a preferred embodiment for practicing the invention, chirped laser radiation induces photoionization of a vapor state material in isotopically selective excitation and ionization energy steps. A frequency sweep or "chirp" is provided in the excitation laser radiation at a controlled rate and over a range of frequencies which is limited to prevent loss of selectivity in the excitation. The frequency swept radiation has a theoretical capability of producing 100% inversion of ground state particles in the vapor. The features of the invention additionally permit excitation of a material to very high energy states useful in producing high frequency, ultraviolet lasing.

37 Claims, 7 Drawing Figures

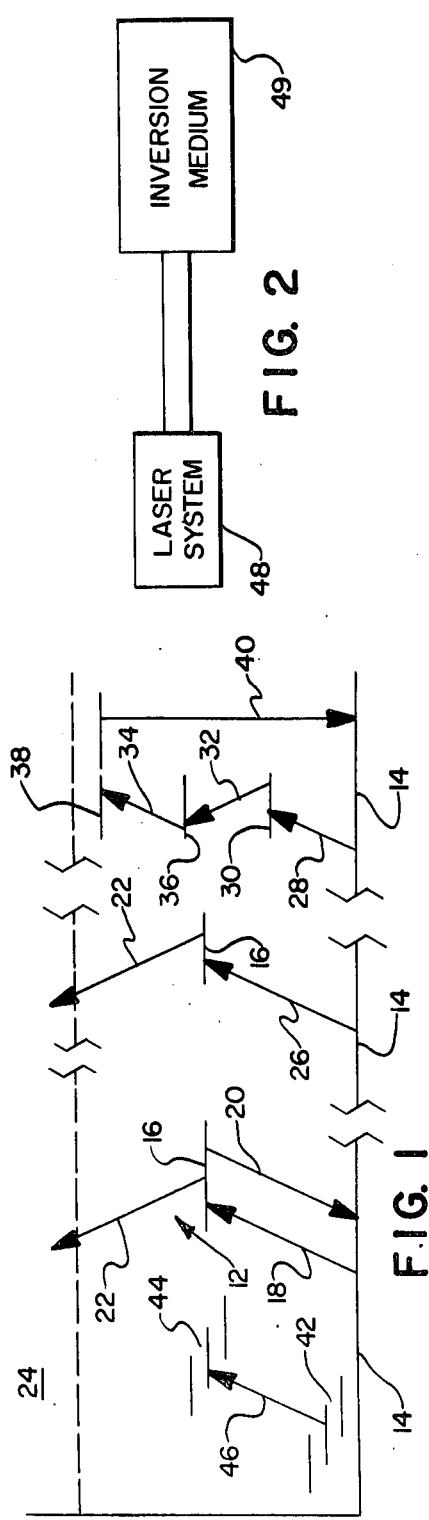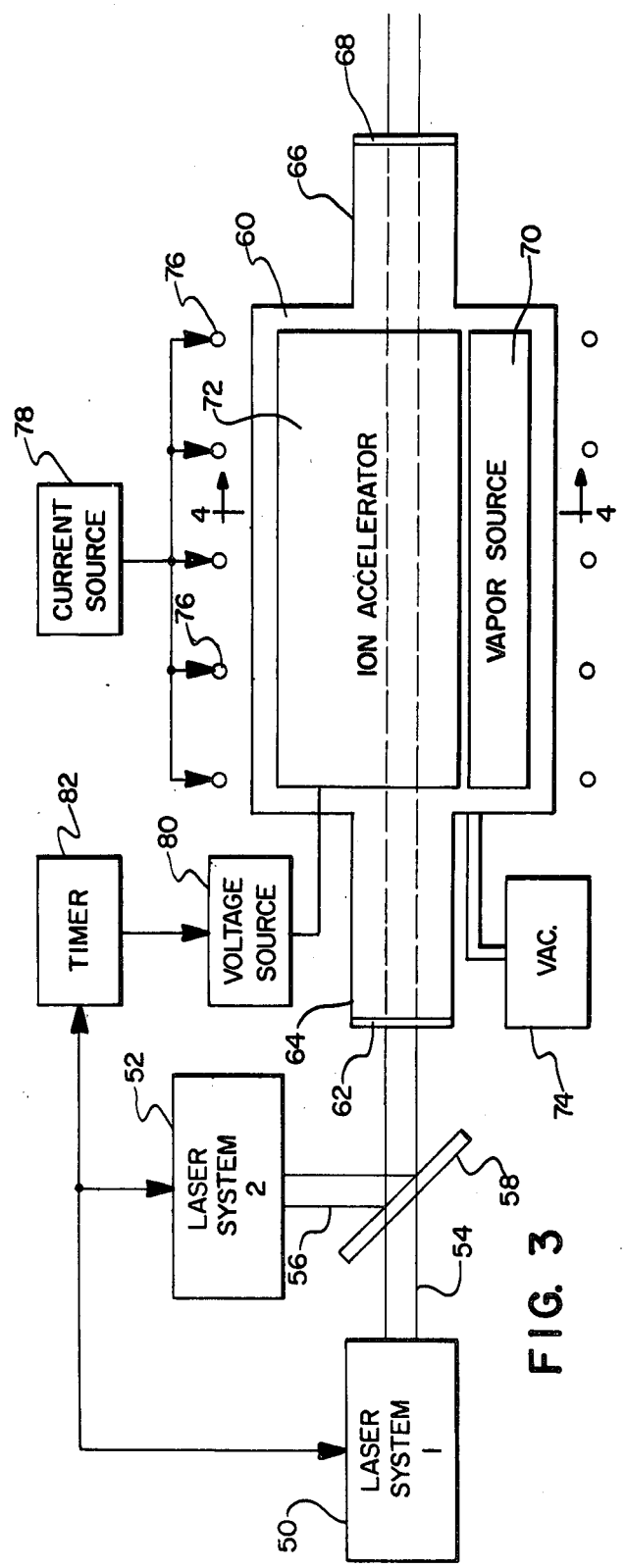

ADIABATIC INVERSION FOR SELECTIVE EXCITATION

CROSS-REFERENCE TO RELATED APPLICATION

This application is a continuation of our application Ser. No. 465,264, filed Apr. 29, 1974, for ADIABATIC INVERSION FOR SELECTIVE EXCITATION now abandoned.

FIELD OF THE INVENTION

This invention relates to photoexcitation and in particular to a method and apparatus for increasing the degree of photoexcitation in a material.

BACKGROUND OF THE INVENTION

A suitably tuned laser beam is a practical source of photons for producing isotopically selective excitation of the orbital electrons in a molecular or elemental state material, particularly in a vapor thereof. In one particular application for this technique, as is specifically disclosed in U.S. Pat. No. 3,772,519, specifically incorporated herein by reference, a system is described for using the radiant energy of lasers to produce selective photoionization of one uranium isotope, typically $U_{235}$, with respect to the other isotopes of uranium. For this purpose, the uranium is first produced in the form of a vapor, the $U_{235}$ particles of which are then laser ionized. The photoionized particles of $U_{235}$ are then typically accelerated out of the vapor environment for separate collecting using magnetohydrodynamic forces.

Theoretical analysis of the factors governing selective photoexcitation predicts that in the presence of constant frequency monochromatic radiation, 50% of the available, illuminated atoms in the uranium vapor will be in a photoexcited state, and 50% will be in the unexcited, typically ground state at any given moment. This theoretical limitation is of significance in the planning of production level enrichment processes because of its effect on enrichment yield.

In a further application for the technique of photoexcitation employing laser radiant energy, it is common to cascade one or more stages of laser amplification on the output of a low power laser in order to boost the energy of the laser to higher levels. The lasing condition in each of the amplifying stages typically results from the presence of a "population inversion" wherein particles in a lasing medium have their orbital electrons excited to a predetermined energy level such that a greater percentage of the medium particles are excited to that particular energy level than the proportion of medium particles in a lower lying energy level. These conditions are theoretically necessary for the simultaneous decay of the excited particles to the lower lying energy state which in turn results in the production of laser radiant energy. The power generated by the lasing medium in these circumstances is directly related to the number of excited particles in the medium. In a two-level lasing system then, the same theoretical considerations as mentioned above would limit the number of excited particles to 50% of the available ones and thereby limit the laser output power accordingly.

In addition, in applications where it is desired to selectively photoexcite particles by laser energy, a substantial frequency broadening may exist in the absorption lines of particles which it is desired to selectively excite as, for example, by Zeeman splitting of the energy levels. The presence of this splitting, or the spreading of the original energy level into several levels covering a range of energies, may further tend to reduce the efficiency of excitation, particularly where very narrow bandwidth laser radiation is employed, as in the case of selective photoexcitation, by having the laser radiation cover a more narrow range of frequencies than the width of the absorption line for the particles being photoexcited.

SUMMARY OF THE INVENTION

In accordance with a preferred embodiment of the present invention, conditions of adiabatic population inversion are produced in particles of a selected isotope type to improve the efficiency of isotope separation. The technology of the present invention may also be applied to create adiabatic inversion to enhance laser efficiency in exciting a lasing medium.

Adiabatic inversion is achieved according to the invention by sweeping the frequency of laser photoexcitation radiation over a frequency range at a controlled rate. The range, in the specific case of isotopically selective excitation, is selected so as not to exceed the isotope shifts in the material irradiated. The rate of sweep is selected so as to satisfy specific constraints related to excited state lifetimes and laser intensity.

In the application to uranium enrichment, the isotopically selective adiabatic inversion depopulates ground energy levels for the desired uranium isotope in favor of an elevated or excited energy level from which further laser radiation produces photoionization in one or more energy steps. By depopulating the ground level, a greater yield of ionized particles is achieved. The selectively photoionized uranium ions may then be separated using the magnetohydrodynamic acceleration forces generally described above in U.S. Pat. No. 3,772,519.

In a further application to laser amplification, the increased population of the excited state achieved through adiabatic inversion is a condition which increases the overall photon density in a laser amplifier. Depopulation of the ground levels also permits the practical realization of a high photon energy, ultraviolet, laser by exciting through additional energy steps to an excited level from which each transition to the ground level produces an ultraviolet photon.

BRIEF DESCRIPTION OF THE DRAWINGS

These and other features of the invention will be more fully described below in a detailed description of the preferred embodiment and in the accompanying drawings of which:

FIG. 1 is an energy level diagram useful in explaining the theory of the present invention;

FIG. 2 is a basic system diagram for practicing the invention;

FIG. 3 is a system diagram of a specific application of the present invention to isotope enrichment;

DETAILED DESCRIPTION OF THE PREFERRED EMBODIMENT

Figure 4:
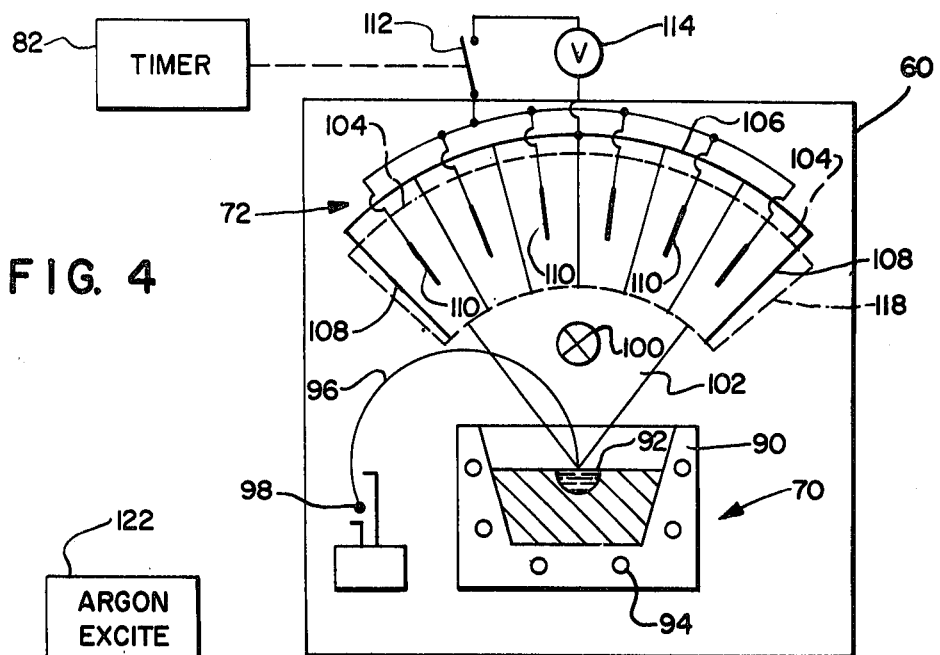
FIG. 4 is an internal sectional view of a portion of the FIG. 3 apparatus.

The present invention contemplates a photoexcitation system for creating an adiabatic inversion in the energy states of particles in a medium. The system for producing adiabatic inversion permits a theoretical 100% excitation of all illuminated medium particles from a ground or low lying energy level to an elevated, excited energy level. This adiabatic inversion permits higher productivity in isotope separation, specifically uranium enrichment, and permits higher amplifications in laser amplifiers, and contributes as well to the feasibility of high energy, typically ultraviolet, lasers.

The adiabatic inversion is achieved by sweeping or "chirping" the frequency of an excitation laser through an absorption line for one isotope type in a medium or environment to which the laser radiation is applied. The width and rate of the frequency sweep or chirp to achieve adiabatic inversion are defined by the characteristic of the excitation laser frequency corresponding to a specific transition in the isotope to be excited, as well as the range of any significant splitting or broadening of degenerate levels in the ground and excited states. The swept frequency range is selected to encompass the broadened absorption line for the split degenerate levels.

These theoretical considerations may best be explained with reference to FIG. 1 which is a diagram of exemplary energy levels and transitions between the levels which illustrate selective excitation without and with the teaching of the invention.

With respect to FIG. 1, a set of transition or energy steps are illustrated which account for the theoretical distribution of atomic particles in excited and ground energy states 14 and 16 of a medium which is irradiated with laser radiation tuned to the frequency of that energy step. In the case of isotopically selective photoexcitation, the laser radiation is tuned to produce a transition 18 from the ground energy state 14 to the excited level 16. A transition 20 from the energy level 24 down to the ground state 22 will comprise an identical energy shift, assuming at this point, no degeneracy in the energy levels. In the presence of this laser radiation, the ground level particles of the appropriate isotope will be stimulated by the laser radiation through their absorption line for excitation to the energy level 16. The same photon energy, however, will be effective to produce stimulated emission which results in the opposite transition 20 from the elevated level 16 to the ground state 14. The probabilities for these two events will be equal for illuminated particles, resulting theoretically in a 50% population of the level 16, and 50% population of the level 14. As a result, only 50% of the original ground state atoms are available in the energy level 24 for photoionization to the continuum 24 in a subsequent transition 22. If photoionizing radiation from typically a second laser is applied to produce a transition 22 simultaneously with the radiation for the transition 18, the level 16 will be continually depleted by transitions into the ionization region 24 which will eventually deplete a larger percentage of the ground state atoms out of the level 14.

A more direct and efficient system of achieving a higher percentage of excited state atoms and correspondingly photoionized atoms is to employ a transition 26 shown in FIG. 1 which produces an adiabatic inversion of ground level atoms to the elevated energy level 16. This adiabatic inversion is achieved by chirping or sweeping the frequency of the exciting laser radiation over a range including the frequency of the transition 26 at a predetermined rate. If the theoretical conditions to be described below are satisfied, then the frequency variation in the radiation forces each particle to switch its energy state rather than having a probability distribution of occupied energy states as described above. Thus, if all, or substantially all, atoms are originally in the ground state 14, the chirped excitation will produce a nearly complete shift to the state 16. Whatever particles may originally exist in the state 16 would correspondingly be switched to the state 14, but this may generally be assumed to be a negligible or insignificant fraction. With substantially all of the atoms excited to the level 16, nearly all of the illuminated atoms are thus in a condition to be photoionized from the level 16 to the continuum 24.

In a further application for the present invention, a laser amplifier may be more efficiently operated with an adiabatic inversion. In that case, a population inversion may be created by the transition 26 to the energy level 16 from which spontaneous emission back to the ground level 14 results in the generation of laser radiation. In a yet further application, the adiabatic inversion of the present invention makes feasible higher photon energy lasers of shorter wavelength as, for example, by permitting a transition 28 from ground level 14 to intermediate level 30, which substantially depopulates the ground level 14 such that additional transition composed of energy steps 32 and 34 to respective energy levels 36 and 38, even though not adiabatic, will still create a population inversion between the levels 14 and 38. This population inversion may be induced to lead to one large energy step 40 from energy level 38 to energy level 14 in a suitably tuned cavity in order to produce laser radiation of very high photon energy, corresponding to approximately the ultraviolet spectral region.

As an additional consideration, a first set of energy levels 42 and 44, representing respectively low lying energy levels and an excited energy level, are illustrated in FIG. 1 as degenerate and having a plurality of discrete energy levels, greatly exaggerated for purposes of illustration. This degeneracy may result from a number of causes, typically Doppler effects from thermal motions of particles in the medium or Zeeman broadening in the presence of a magnetic field, particularly when used in association with a system for uranium enrichment employing magnetohydrodynamic forces. As a result of the broadening of the levels 42 and 44, there will be a broadening of the absorption line for a particular transition 46 between the energy levels 42 and 44 since more than one allowed transition of slightly different energies may exist between the separate levels. Thus, if very narrow bandwith laser radiation is employed for selective photoexcitation of one particular isotope type between the energy levels 42 and 44, it may be too narrow to encompass all of the broadened absorption line. This would result in reduced excitation efficiency for that laser radiation. By sweeping the frequency of the applied excitation laser radiation, in accordance with the method and apparatus of the present invention described below, photoexcitation may be achieved generally over the entire, broadened absorption line.

For purposes of establishing specific parameters for this invention, a mathematical analysis is presented below for a system with two energy levels, a and b, separated by an energy $\hbar\omega_o$. The system of these energy levels is described by wave functions $\psi a$ and $\psi b$. The unperturbed Hamiltonian of the system is defined as $H_o$, and with energies measured from the point midway between the two levels, then in matrix notation, $H_o$ is $$H_o = \frac{1}{2}\hbar\omega_o \begin{vmatrix} 1 & 0 \\ 0 & -1 \end{vmatrix}$$

where $\hbar$ is Plank's constant and $\omega_o$ the angular frequency corresponding to the energy between levels. The system is assumed to have no permanent electric dipole moment, but does possess a transition dipole moment connecting the states a and b. That is $\mu \neq 0$, where $$\underline{\mu} = e<a|\underline{X}|b> = e\psi a^* \underline{X} \psi b$$

The phases of the states may always be arranged to make $\mu$ real, and this is assumed to be the case.

In a static electric field, $\underline{E}$ an interaction Hamiltonian of the form $$H_{int} = \underline{\mu} \cdot \underline{E} \begin{vmatrix} 0 & 1 \\ 1 & 0 \end{vmatrix}$$

mixes the states a and b. The wave functions of the stationary states in this case are linear combinations of $\psi a$ and $\psi b$, namely just those which diagonalize the full Hamiltonian, $H_o + H_{int}$:

$$\begin{vmatrix} \frac{1}{2}\hbar\omega_o & \underline{\mu} \cdot \underline{E} \\ \underline{\mu} \cdot \underline{E} & -\frac{1}{2}\hbar\omega_o \end{vmatrix} \begin{vmatrix} a \\ b \end{vmatrix} = \hbar\Omega \begin{vmatrix} a \\ b \end{vmatrix}$$

The solution of the secular equation for $\Omega$ is then $$\Omega = \pm \sqrt{\left(\frac{1}{2}\omega_o\right)^2 + \gamma^2}$$

where $$\gamma = \frac{\underline{\mu} \cdot \underline{E}}{\hbar}.$$

Defining the angle $\theta$ by $$\tan\theta = \frac{\gamma}{\frac{1}{2}\omega_o}, \quad \gamma = \pm\Omega\sin\theta$$

$$\frac{1}{2}\omega_o = \pm\Omega\cos\theta$$

there are then two solutions for the eigenfunction:

$$\left.\begin{array}{l} a = \cos\frac{\theta}{2} \\ b = \sin\frac{\theta}{2} \end{array}\right\} \text{corresponding to } \Omega = +\sqrt{\frac{1}{4}\omega_o^2 + \gamma^2}$$

$$\left.\begin{array}{l} a = -\sin\frac{\theta}{2} \\ b = \cos\frac{\theta}{2} \end{array}\right\} \text{corresponding to } \Omega = -\sqrt{\frac{1}{4}\omega_o^2 + \gamma^2}$$

In a slowly turned-on electric field, if the atom started off in the ground state we have $$\begin{vmatrix} a \\ b \end{vmatrix}_{initial} = \begin{vmatrix} 0 \\ 1 \end{vmatrix}$$

and $$\Omega_{initial} = -\tfrac{1}{2}\omega_o$$

This solution is that corresponding to the minus sign in front of the square root, above. The effect of turning on the field is then to "rotate" $\psi$ into a final state $$\begin{vmatrix} a \\ b \end{vmatrix}_{final} = \begin{vmatrix} -\sin\frac{\theta}{2} \\ \cos\frac{\theta}{2} \end{vmatrix}$$

and $$\Omega_{final} = -\sqrt{\tfrac{1}{4}\omega_o^2 + \gamma^2}$$

If the atom had started off in the excited state, the situation described by the positive square root solution would have been appropriate.

Now in the case of an atom interacting with a rapidly oscillating optical electric field, $\underline{E}(t)$ $$\underline{E}(t) = \epsilon e^{i\omega t},$$

and the time dependence of the wave function is given by $$i\hbar \begin{vmatrix} \dot{a} \\ \dot{b} \end{vmatrix} = \begin{vmatrix} \frac{1}{2}\hbar\omega_o & \underline{\mu} \cdot \underline{\epsilon}e^{i\omega t} \\ \underline{\mu} \cdot \underline{\epsilon}^* e^{-i\omega t} & -\frac{1}{2}\hbar\omega_o \end{vmatrix} \begin{vmatrix} a \\ b \end{vmatrix} \quad (1)$$

The solutions of this differential equation in matrix form is:

$$-\hbar\omega_a A e^{i(\omega_a - \frac{1}{2}\omega_0)t} = \underline{\mu} \cdot \underline{\epsilon} B e^{i(\omega_b - \frac{1}{2}\omega_0)t}$$

$$-\hbar\omega_b B e^{i(\omega_b - \frac{1}{2}\omega_0)t} = \underline{\mu} \cdot \underline{\epsilon} A e^{i(\omega_a - \frac{1}{2}\omega_0)t}$$

with A and B as constants to be determined.

If $\omega_a - \omega_b$ are selected such that $\omega - \omega_o \equiv \Delta\omega$, the same time dependence exists on either side of this equation which can be then written $$\begin{vmatrix} \omega_a & \gamma \\ \gamma^* & \omega_b \end{vmatrix} \begin{vmatrix} A \\ B \end{vmatrix} = 0$$

where $$\gamma = \frac{\mu \cdot \varepsilon}{h}$$

The determinant of the matrix must vanish, of course, which fixes $\omega_a$ and $\omega_b$:

$$\omega_a = \tfrac{1}{2}\Delta\omega + \lambda$$

$$\omega_b = -\tfrac{1}{2}\Delta\omega + \lambda$$

where $$\lambda = \pm\sqrt{(\tfrac{1}{2}\Delta\omega)^2 + \gamma^2}$$

Finally from the above relationship $$\frac{A}{B} = -\frac{\gamma}{\omega_a} = -\frac{\omega_b}{\gamma^*}$$

and $$\tan\theta = \frac{|\gamma|}{\tfrac{1}{2}\Delta\omega}$$

there results $$|\gamma| = \pm\lambda \sin\theta; \quad \tfrac{1}{2}\Delta\omega = \pm\lambda \cos\theta$$

and as the solution $$\left.\begin{array}{l} |A|^2 = \sin^2\frac{\theta}{2} \\ |B|^2 = \cos^2\frac{\theta}{2} \end{array}\right\} \text{corresponding to } \lambda = \sqrt{(\tfrac{1}{2}\Delta\omega)^2 + |\gamma|^2}$$

$$\left.\begin{array}{l} |A|^2 = \cos^2\frac{\theta}{2} \\ |B|^2 = \sin^2\frac{\theta}{2} \end{array}\right\} \text{corresponding to } \lambda = -\sqrt{(\tfrac{1}{2}\Delta\omega)^2 + |\gamma|^2}$$

By varying the optical frequency $\omega$ from one side of the resonance to the other, if the variation is "slow enough," the system will satisfy Eq. (1) at any given moment, and will be able to "follow" the change in $\omega$. For $|\Delta\omega| \gg |\gamma|$, $\theta$ is near zero, and the solution corresponds to having the atom initially in the ground state, b. As $|\Delta\omega|$ decreases, $\theta$ approaches $\pm 90°$ (depending on the sign of $\Delta\omega$). At $\Delta\omega=0$, $\theta=\pm 90°$ and $|A|^2=|B|^2$. The probability of finding the atom in the excited state is then equal to that of finding it in the ground state. This situation corresponds to saturation, with an unchirped radiation pulse. As the frequency sweeps through $\omega_0$; in the same direction with $\omega$ finite, $\theta$ varies continuously toward $\pm 180°$. As $|\Delta\omega|$ becomes very large, compared to $|\gamma|$, $\theta$ approaches $180°$ and the atom becomes inverted, i.e., if $|A|$initial$=0$; $|B|$initial$=1$; then $|A|$final$=1$; $|B|$final$=0$. This is so regardless of the direction of the frequency chirp, as long as chirp direction remains the same throughout the chirp. This ensures that $\Delta\omega$ will be a monotonic function, varying between $-\infty$ and $\infty$ and $\theta$ will vary between $0°$ and $180°$. This is one condition on the chirp.

There remains the question of how slow a variation is "slow enough" for the steady state solutions to be valid, or in other words, for the creation of the adiabatic inversion. The frequency sweep may be considered adiabatic, in the sense defined above, if the time in which the frequency changes from $-|\gamma|/2$ to $+|\gamma|/2$ is greater than $2\pi/|\gamma|$, which is the maximum time during which the atom makes a complete cycle, going from state a to b and back to a again. The "slowness" of the chirp depends, therefore, on the intensity of the light at the optical frequency. A chirp which would be too fast to invert an atom at one intensity, may very well do so at a higher intensity.

The above theory identifies the system parameters for adiabatic inversion in the context of isotope separation or laser amplification. The apparatus which may be employed for this purpose is shown with reference to FIGS. 2–7. In general, as shown in FIG. 2, the invention will employ a laser system 48 and a medium 49 to which radiation for an adiabatic inversion is applied. FIG. 3 illustrates an embodiment of this apparatus for isotope enrichment, particularly of the uranium $U_{235}$ isotope. With regard to FIG. 3, first and second laser systems 50 and 52 provide respective output beams of laser radiation 54 and 56, which are combined, for example in a dichroic mirror 58, for application to an isotope separation chamber 60 through a window 62 on a pipe 64. In typical implementation, the laser system 50 may comprise the excitation laser whose output radiation in beam 54 is employed and correspondingly tuned for selective photoexcitation. The laser beam 56 from laser system 52 may comprise one or more frequencies of laser radiant energy for producing selective photoionization from the excited state in one or more energy steps. The beams 54 and 56 are typically applied simultaneously in pulses having a duration of about a microsecond or less. Pulse repetition rates up to 50 KH$_z$ are preferable but much lower rates can be used. The combined laser beam applied to the chamber 60 traverses its length and exits through a pipe 66 and window 68, typically for application to one or more similar chambers. The window 62 and 68 may comprise optical quartz and the pipes 64 and 66 are provided in order to remove the windows 62 and 68 from the vapor atmosphere within the chamber 60 so as to reduce deposits on the windows. Shutters may be added to isolate the windows except during illumination with laser radiation.

A uranium vapor is generated in chamber 60 by a vapor source 70 and directed through the laser radiation beam into an ion accelerator 72. A vacuum pump 74 maintains a very low pressure within the chamber 60 to prevent atmospheric components from disturbing the selective photoexcitation and ionization process, as well as separate collection of the ionized particles within the chamber 60.

A plurality of magnetic field coils 76 surround the chamber 60 approximately coaxial to the applied laser beam. Coils 76 create an axial magnetic field within the region of the ion accelerator 72. The coils 76 are excited from a current source 78. An orthogonal electric field is created within the ion accelerator from a voltage source 80 in order to generate crossed-field magnetohydrodynamic forces for the acceleration of ionized particles onto separate collection surfaces. The voltage source 80 is controlled for periodic application of the electric field, typically just subsequent to the application of each laser pulse in the beams 54 and 56 by a timer 82. Timer 82 is also employed to activate the laser systems 50 and 52 for typically simultaneous output. A cycle of laser radiation and applied voltage will typically occupy a period of several microseconds.

With reference now to FIG. 4, there is shown an internal sectional view of a portion of the chamber 60 from FIG. 3. In particular, the vapor source 70 is shown to include a crucible 90 containing a mass of elemental uranium 92 and having a plurality of cooling ports 94 supplied, for example, with water to remove the heat applied to the uranium 92 to produce vaporization. Vaporization is produced by energy from a beam 96 of electrons emanating from a filamentary source 98. The electron beam 96 is deflected by a magnetic field 100, produced by coils 76, to a focus along a line or series of spots on the surface of uranium mass 92. The energy in the incident beam is selected to be sufficient to produce vaporization of the uranium along the line of incidence in a radially expanding flow 102 into the ion accelerator 72.

The ion accelerator 72 is shown to include a plurality of chambers 104 defined by an arcuate upper collection plate 106, generally concentric to the vapor line source, and having a plurality of radially extending plates 108 which extend radially toward the vapor line source. Within each chamber 106, a central electrode 110 is placed. Each electrode 110 is electrically connected in common and applied through a switch 112 to one side of a voltage source 114. The other side of the voltage source 114 is connected to the structure of plates 106 and 108. The voltage between the plates 110 and 108 provided by the source 114 in conjunction with the magnetic field 100 is operative to provide crossed-field magnetohydrodynamic acceleration on ionized particles in the chambers 108. For this purpose, voltage source 114 is typically on the order of a few hundred volts and magnetic field 100 is typically in the range of a few hundred Gauss. The switch 112 is activated by the timer 92 to provide switch closure for a short duration, typically one or two microseconds, directly subsequent to each burst of laser radiation in the beams 54 and 56.

$U_{235}$ particles in the chambers 104 are selectively ionized by irradiating a region 118 throughout the length of the chamber 60 by the combined beams 54 and 56. The particular shape of region 118 may be achieved through suitable masking of the beam or multiple reflections through the chamber 60. Once ions of the $U_{235}$ isotope have been selectively produced through photoionization or otherwise, the voltage pulse applied between the plates 110 and 108 in conjunction with magnetic field 100 circulates the plasma electrons about the electrodes 110 and accelerates the ions for collection toward plates 108. Repeated applications of laser radiation and electric potential results in a build-up of enriched uranium on the plates 108 and depleted uranium on the plate 106.

Figure 5:
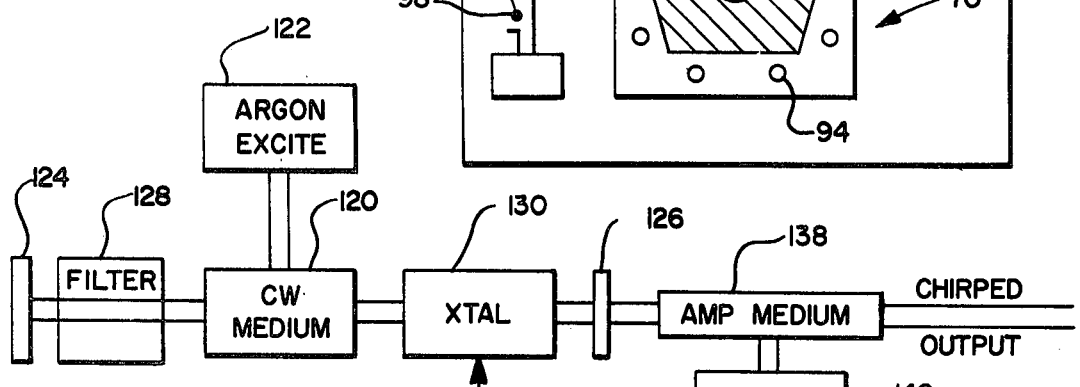
FIG. 5 is a diagram of a laser system for use in practicing the invention.
Figure 6:
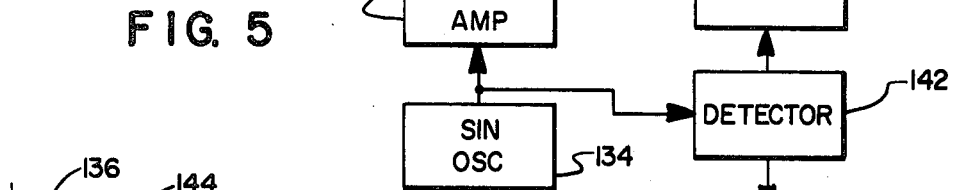
FIG. 6 is a waveform diagram useful in explaining the operation of the FIG. 5 system.

With reference to FIG. 5, there is shown a laser system for generating the frequency swept laser radiation for use in the separation system of FIGS. 3 and 4 as, for example, laser system 50. It comprises a CW lasing medium 120 which is typically a dye solution. The medium 120 is excited to a lasing condition by radiation from a further, Argon laser 122. The medium 120 has a cavity defined by mirror 24 and a partially reflecting output mirror 126. The cavity may contain filters 128 or other means for mode selection or frequency control as necessary to select a narrow bandwidth in the absorption line for the $U_{235}$ isotope but not the $U_{238}$ isotope. In addition, a crystal 130 which may be an electro-optic element is placed in the path of the laser beam from the medium 120 within the cavity. The crystal 130 is electrically modulated through a power amplifier 132 from an oscillator 134 which may be a sinewave oscillator in the embodiment of FIG. 5. The modulation effects a variation in the index of refraction of crystal 130 in correspondence with the impressed voltage. Crystals which may be used include lithium tantalate and potassium dideuterium phosphate. It is important that only a single frequency mode is present at any instant.

The signal from the power amplifier 132 controls the optical properties of the crystal 130 so as to vary the resonant frequency of the cavity between the mirrors 124 and 126 in accordance with the sinewave output of the oscillator 134. This effect is illustrated in a curve 136 in FIG. 6. The output beam from the mirror 126 is applied to an amplifying medium 138 which is in turn pumped to a lasing condition by an exciter 140 that may typically include a flashlamp. The exciter 140 is controlled by a voltage detector 142 which receives the output of the sinewave oscillator 134 and detects selected points such as points 144 and 146 on, for example, the falling portion of the sinewave 136. The voltage detector 142 activates the exciter 140 to commence pumping of the medium 138 at the point 144 and controls the exciter 140 to insure termination of output from the medium 138 at the point 146. The resulting control of the amplifier insures that the amplified output of medium 138 exists only during the interval between points 144 and 146 which essentially correspond to a nearly linear sweep in frequency output. The detector 142 also provides a signal to timer 82 to identify the cessation of laser radiation and commence activation of switch 112 immediately or within a fraction of a microsecond.

Figure 7:
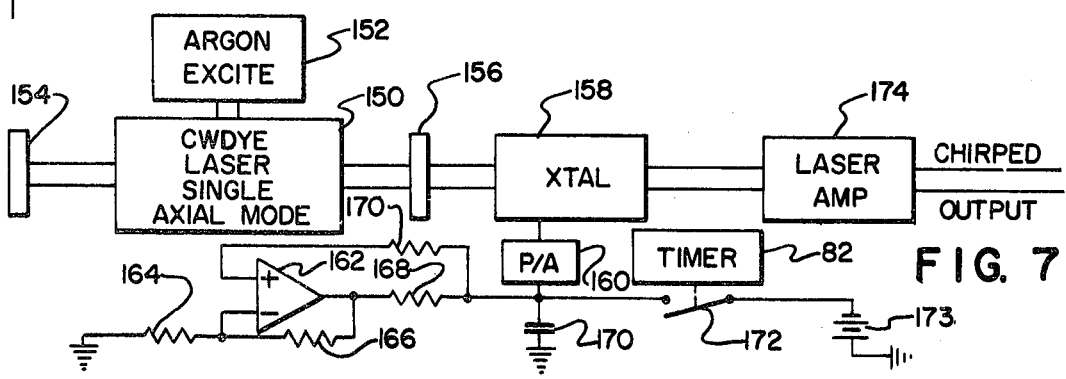
FIG. 7 is an alternate diagram of a laser system for practicing the invention.

With reference to FIG. 7, a further implementation of a laser system for providing a swept output is shown. A CW dye laser 150 having a single axial mode is excited from an Argon laser 152 to lase within a cavity defined by mirror 154 and partially reflecting output mirror 156. A crystal 158, similar to crystal 130, is provided outside the cavity in the beam path and is controlled by a power amplifier 160 which, in turn, receives the output of a waveform generator. The waveform generator includes a differential amplifier 162, having on its inverting input the signal at the junction of first and second resistors 164 and 166 which form a voltage divider between ground and the output of amplifier 162. A further resistor 168 leads from the output of amplifier 162 to the higher side of a grounded capacitor 170 which is, in turn, connected as the input of amplifier 160. A feedback resistor 172 connects the input to power amplifier 160 to the noninverting input of amplifier 162. A switch 172 selectively connects the input of power amplifier 160 to a predetermined potential 173 under control of timer 82. The switch 172 is controlled to disconnect this potential from the input to amplifier 16 only during the interval when the excitation laser output is desired. The configuration of the waveform generator insures a voltage output which is a quadratic function of time which when applied to time vary the length of the optical path through crystal 158 to frequency modulate the radiation creates a linear time variation in radiation frequency. The output of the mirror 156 is applied through a laser amplifier system 174 which, in turn, provides the chirped laser radiation output.

The laser system 52 will not be frequency swept unless exciting lasers are included in it. Accordingly, no electro-optic crystal need be provided for that laser.

The radiation frequency for laser 50 will be centered at an absorption line for $U_{235}$ in the case of uranium $U_{235}$ enrichment, for a transition to an elevated energy level. In the case where laser system 52 provides a single frequency, it will typically produce sufficient photon energy to ionize from the elevated energy state created by laser system 50. Specific absorption lines for excitation of $U_{235}$ are numerous and may be found in the literature. The lasers 50 and 52 may include Dial-A-Line laser system of the Avco Everett Research Laboratory, preferably with one or more stages of amplification. Where a Dial-A-Line laser is employed, laser system 50 will include the frequency modulating apparatus described above in FIGS. 5 and 7, in addition to the Dial-A-Line.

Two specific examples are given below for laser radiation characteristics which, according to the above theory, will produce an adiabatic inversion of the ground state uranium $U_{235}$ in three energy steps ($E_1$, $E_2$ and $E_3$) to a level below ionization. In both cases, uranium vapor produced according to the above-described system is illuminated with three laser wavelengths tuned to produce three isotopically selective adiabatic inversions to a final excited level below ionization. The specific absorption lines may be selected from spectrographic observations or published tabulations for the initial step. The frequency range of the swept radiation for each wavelength is approximately 3 GHz, or about twice the broadening of the $U_{235}$ absorption line due to Doppler and magnetic field induced Zeeman effects. The calculated excitation cross sections for the first two energy steps are approximately $5 \times 10^{-16} cm^2$. For the first case, the total energy density for the lasers for the first two steps are chosen at 1 millejoule-$cm^{-2}$ per pulse and 4 millejoule-$cm^{-2}$ per pulse for the third step laser. Under these circumstances, 98% of the available atoms are photoexcited, inverted, in each of the first two steps, and 81% in the third step to produce a total excitation of 79% to the third level. In the second case, the energy densities are raised to 1.3 millejoule-$cm^{-2}$ in the first two lasers and 10 millejoule-$cm^{-2}$ in the third laser pulses. The percent excitation in the first two energy steps is essentially 100% and 98% in the third step for a total excitation yield of 98%. Ionization from the third level may be produced by a further laser's radiation.

The calculations above assume a linear energy loss in laser beam intensity in passing through the uranium vapor and further specify laser energy densities in terms of the energy remaining in the laser beam after passing through the uranium vapor. Finally, frequency sweep disturbances from the uranium vapor have been ignored, a condition which may be satisfied by making the radiation path through the vapor sufficiently short.

Having described above a preferred embodiment of the present invention, it will occur to those skilled in the art that alternatives and modifications can be designed within the spirit of the invention. It is accordingly intended to limit the scope of the invention only as indicated in the following claims.

What is claimed is:

1. A system for switching the energy state of particles of one isotope type in an environment of plural isotope types, said system comprising:
   means for generating radiant energy of a bandwidth sufficiently narrow to be absorbed by one isotope type of said particles in said environment without corresponding absorption by other particles of said environment; and
   means for sweeping the frequency of said radiant energy over a range of frequencies encompassing an absorption line for said one isotope type to provide selective energy state switching in the particles of that one isotope type without corresponding energy state switching of other particles in said environment;
   the frequency sweep of said radiant energy being defined to produce a change in the energy state of particles of said one isotope type.

2. The system for switching the energy state of particles of claim 1 wherein said change in energy state includes a change from a lower lying energy level to an upper lying energy level.

3. The system for switching the energy state of particles of claim 2 wherein the frequency swept radiant energy is operative to produce adiabatic inversion in the energy states.

4. The system for switching the energy state of particles of claim 2 further including means for photoionizing the particles of the one isotope type switched in energy to said upper level.

5. The system for switching the energy state of particles of claim 4 further including means for separating the photoionized particles of said environment for separate collection thereof.

6. The system for switching the energy state of particles of claim 5 wherein said separating means includes means for applying crossed-field magnetohydrodynamic forces to the photoionized particles of said environment.

7. The system for switching the energy state of particles of claim 1 wherein said generating means includes means for generating laser radiant energy.

8. The system for switching the energy state of particles of claim 1 wherein said one isotope type includes an isotope of uranium.

9. The system for switching the energy state of particles of claim 1 further including means for generating said environment of particles as a vapor flow.

10. The system for switching the energy state of particles of claim 1 wherein said means for sweeping the frequency of said radiant energy includes:
    an element in the path of said radiant energy having a refractive index variable in response to a signal; and
    means for applying a signal to said element with a variation therein operative to vary the frequency of said radiant energy.

11. The system for switching the energy state of particles of claim 10 wherein:
    said means for generating radiant energy includes at least one source of laser radiation having a resonant cavity; and
    said element is an electro-optic crystal placed within said cavity.

12. The system for switching the energy state of particles of claim 11 wherein said means for generating said signal is operative to provide a signal having a generally linear portion for application to said electro-optic crystal.

13. The system for switching the energy state of particles of claim 10 wherein:
    said means for generating radiant energy includes means for generating laser radiation and having a resonant cavity; and
    said element includes an electro-optic crystal placed outside said cavity.

14. The system for switching the energy state of particles of claim 13 wherein said means for generating said signal for application to said element includes means for generating a signal having a portion varying quadratically with time thereby to produce a generally linear variation in frequency with time in the radiation passing through said electro-optic crystal during the quadratically varying portion of said signal.

15. The system for switching the energy state of particles of claim 1 wherein the frequency range of the frequency sweep of said radiant energy includes approximately 3 $GH_z$ and the radiant energy density of radiant energy leaving said environment is at least approximately 1 millejoule.

16. The system for switching the energy state of particles of claim 1 wherein:
    said means for generating radiant energy includes means for generating pulses of said radiant energy; and
    the range of sweeping of the frequency of said radiant energy is related to the intensity of radiant energy so as to produce a predetermined energy density in each pulse of said radiant energy.

17. The system for switching the energy state of particles of claim 1 wherein:
    the absorption line for the one isotope type is broader than the bandwidth of said radiant energy; and
    the frequency range of said swept radiant energy is generally at least as wide as substantial portions of said absorption line.

18. A method for switching the energy state of particles of one isotope type in an environment of particles of plural isotope types, said method comprising the steps of:
    generating radiant energy of a bandwidth sufficiently narrow to be absorbed by one isotope type of said particles in said environment without corresponding absorption by other isotope types of the particles of said environment; and
    sweeping the frequency of said radiant energy over a range of frequencies encompassing an absorption line for said one isotope type to provide selective energy state switching by the particles of that one isotope type without corresponding energy state switching by other particles in said environment;
    the frequency sweep of said radiant energy being defined to produce a change in the energy state of the particles of said one isotope type.

19. The method for switching the energy state of particles of claim 18 wherein said change in energy state includes a change from a lower lying energy level to an upper lying energy level.

20. The method for switching the energy state of particles of claim 19 wherein the frequency swept radiant energy is operative to produce adiabatic inversion in the energy states.

21. The method for switching the energy state of particles of claim 18 further including the step of photoionizing the particles of the one isotope type switched in energy to said upper level.

22. The method for switching the energy state of particles of claim 21 further including the step of separating the photoionized particles of said environment for separate collection thereof.

23. The method for switching the energy state of particles of claim 22 wherein said separating step includes the step of applying crossed-field magnetohydrodynamic forces to the photoionized particles of said environment.

24. The method for switching the energy state of particles of claim 18 wherein said generating step includes the step of generating laser radiant energy.

25. The method for switching the energy state of particles of claim 18 wherein said one isotope type includes an isotope of uranium.

26. The method for switching the energy state of particles of claim 18 further including the step of generating a vapor flow to provide said environment of particles.

27. The method for switching the energy state of particles of claim 18 wherein said step of sweeping the frequency of said radiant energy includes the step of:
    applying a time varying signal to an element in the path of radiant energy; and
    said element in the path of said radiant energy having a refractive index variable in response to a signal.

28. The method for switching the energy state of particles of claim 27 wherein:
    said step of generating radiant energy includes the step of generating laser radiation within a resonant cavity for the laser radiation;
    said element being an electro-optic crystal placed within said cavity.

29. The method for switching the energy state of particles of claim 28 wherein said step of generating said time varying signal provides a signal having a generally linear portion for application to said electro-optic crystal.

30. The method for switching the energy state of particles of claim 29 wherein:
    said step of generating radiant energy includes generating laser radiation within a cavity; and
    said element includes an electro-optic crystal placed outside said cavity.

31. The method for switching the energy state of particles of claim 30 wherein said step of generating said signal for application to said element includes generating a signal having a portion varying quadratically with time thereby to produce a generally linear variation in frequency with time in the radiation passing through said electro-optic crystal during the quadratically varying portion of said signal.

32. The method for switching the energy state of particles of claim 18 wherein the frequency range of the frequency sweep of said radiant energy includes approximately 3 $GH_z$ and the radiant energy density of radiant energy leaving said environment is at least approximately 1 millejoule.

33. The method for switching the energy state of particles of claim 18 wherein:
    said step of generating radiant energy includes generating pulses of said radiant energy; and
    the range of sweeping of the frequency of said radiant energy is related to the intensity of radiant energy so as to produce a predetermined energy density in each pulse of said radiant energy.

34. The method for switching the energy state of particles of claim 18 wherein:
    the absorption line for the one isotope type is broader than the bandwidth of said radiant energy; and
    the frequency range of said swept radiant energy is generally at least as wide as substantial portions of said absorption line.

35. A system for creating a predetermined energy state switch in particles of one isotope type in an environment of particles of plural isotope types, said system comprising:

means for generating an environment of particles of said isotope type which is penetrable by radiant energy;

means for generating pulses of laser radiation;

means for controlling said laser radiation for isotopically selective excitation and including:

means for defining a radiation bandwidth sufficiently narrow to encompass an absorption line for said one isotope type without correspondingly encompassing an absorption line for other isotope types in said environment;

an electro-optic element in the path of said laser radiation and having an index of refraction variable in response to an electrical signal;

means for generating a time varying electrical signal for application to said electro-optic element to produce a variation in the frequency of each pulse of said laser radiant energy with time;

the variation of said electrical signal being operative to vary the frequency of said laser radiation through the absorption line for said one isotope type without substantially encompassing the absorption line for the other isotope types;

the range of variation of said electrical signal producing a frequency sweep of each pulse of said radiant energy which is related to the intensity of each pulse of said radiant energy in said environment to create a predetermined energy density for each pulse of laser radiation in said environment;

said predetermined energy density being operative to switch the energy states of the particles of said one isotope type.

36. The system for switching the energy state of particles of claim 1 wherein said means for generating radiant energy includes means for generating laser radiant energy of a single frequency.

37. The system for switching the energy state of particles of claim 1 wherein said means for generating radiant energy includes means for generating a single axial mode of laser radiant energy.

* * * * *

UNITED STATES PATENT AND TRADEMARK OFFICE
CERTIFICATE OF CORRECTION

PATENT NO. : 4,156,144
DATED : May 22, 1979
INVENTOR(S) : Charles T. Pike et al.

It is certified that error appears in the above—identified patent and that said Letters Patent is hereby corrected as shown below:

Column 1, lines 9-10  "EXCITATION now abandoned." should read --EXCITATION.--.

Column 5, line 9, "$H_o = \frac{1}{2} hw_o \begin{vmatrix} 1 & 0 \\ 0 & -1 \end{vmatrix}$" should read --$H_o = \frac{1}{2} \hbar w_o \begin{vmatrix} 1 & 0 \\ 0 & -1 \end{vmatrix}$--;

line 37, "$hw_o$" should read --$\hbar w_o$--;

line 38, "h" should read --$\hbar$--; and
line 52, "h" should read --$\hbar$--.

Column 7, "line 14, "$\lambda = \pm \sqrt{(\frac{1}{2} \Delta w)^2 + \gamma^2}$" should read --$\lambda = \pm \sqrt{(\frac{1}{2} \Delta w)^2 + \gamma^2}$--.

Signed and Sealed this

Sixth Day of October 1981

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,156,144
DATED : May 22, 1979
INVENTOR(S) : Charles T. Pike, et al It is certified that error appears in the above—identified patent and that said Letters Patent is hereby corrected as shown below:

| | | |
|---|---|---|
| Column 3, | line 41, | "energy level 24" should read --energy level 16--; |
| | line 42, | "energy level 22" should read --energy level 14--; and |
| | line 55, | "energy level 24" should read --energy level 16--. |
| Column 4, | line 55, | "bandwith" should read --bandwidth--. |

Signed and Sealed this

Eighth Day of December 1981

[SEAL]

Attest:

GERALD J. MOSSINGHOFF

Attesting Officer    Commissioner of Patents and Trademarks